Patented Mar. 26, 1940

2,194,924

UNITED STATES PATENT OFFICE 2,194,924

SPRAY COMPOSITION

Gerald H. Coleman and John W. Zemba, Midland, Mich., assignors to The Dow Chemical Company, Midland, Mich., a corporation of Michigan No Drawing. Application July 2, 1938,
Serial No. 217,227

4 Claims. (Cl. 167—24)

This invention relates to compositions particularly adapted for use in combating insect pests, such as flies, mosquitoes, moths, gnats, and the like.

Insect sprays comprising solutions of pyrethrin in a non-aqueous solvent are widely used for the control of household insect pests. Such sprays are known to have a quick but temporary paralyzing action on flies and similar insects. Where it is possible to collect and destroy paralyzed insects immediately after treatment, the use of pyrethrum extracts has proved adequate, but generally speaking the kill obtained thereby is low compared to the per cent knockdown of insects. Sprays comprising rotenone have also been used, but have been found to have a relatively low knockdown as compared to pyrethrin and to be rather slow in their action, requiring a considerable period of time to actually kill the sprayed insects. A further disadvantage in the use of rotenone lies in its relative insolubility in many petroleum fractions and its toxicity to humans. Plant extracts comprising pyrethrins, rotenone, and the like, are very unstable to heat and light and upon storage rapidly lose their effectiveness.

It is among the objects of this invention to provide an improved spray composition for exterminating common insect pests, such as flies, mosquitoes, etc., which will be more quickly and more permanently toxic thereto than the fly sprays and insectifuges at present employed, and with which the percentage kill of insects will closely approach the knockdown initially obtained. A further object is to provide a composition compatible with the common insecticidal plant extracts which will serve as a solubilizing agent for difficultly soluble products, such as rotenone, and also stabilize insecticidal plant extracts against deterioration.

In a co-pending application, Serial No. 158,335, filed August 10, 1937, now Patent No. 2,133,972, issued October 25, 1938 we have disclosed that hydroxy-alkyl ethers of phenols, added in relatively small amounts to insecticidal plant extracts, e. g. extracts of derris, cube, barbasco, pyrethrum, etc., improve the stability of the extracts to heat and light, and increase their paralyzing and lethal effect on insects. It is also shown that solutions containing up to about 10 per cent of such hydroxy-alkyl ethers of the phenols can be substituted for petroleum distillate solutions of insecticidal plant extracts for use as fly sprays and the like.

We have discovered that hydroxy-alkyl ethers of certain alkylated phenols have a higher insecticidal efficiency and are more suitable for use as fly sprays than are hydroxy-alkyl ethers of phenols generally. The compounds with which this invention is particularly concerned are those having the following formula

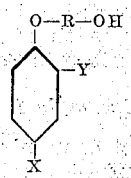

wherein R represents an alkyl residue containing not more than 4 carbon atoms, X represents an alkyl group, and Y represents an alkyl group or hydrogen, the sum of the carbon atoms in the alkyl substituents on the ring being from 4 to 7, inclusive. The hydroxy-alkyl ethers of alkyl phenols have been found to be comparatively innocuous as regards their effect upon human beings and warm blooded animals. Particularly advantageous is the fact that they do not cause irritation and dermatitis upon contact with living tissue and skin. Solutions of the above compounds in inert organic solvents can be substituted for petroleum distillate solutions of insecticidal plant extracts as fly sprays, comparing favorably in toxic effectiveness therewith and having certain advantages of color, odor and stability to heat and light over such plant extract solutions.

These compounds may also be added in small amounts to solutions of the insecticidal plant extracts to stabilize the solutions and increase their effectiveness as fly sprays. For example, the addition of from 0.5 to 5 per cent of the hydroxy-alkyl ether to a pyrethrin solution containing the toxic ingredient of from 0.25 to 1 pound of pyrethrum flowers per gallon, produces a spray material giving a kill of flies substantially equal to the knockdown, such knockdown in many instances approximating 100 per cent. Similarly, the hydroxy-alkyl ethers may be mixed with rotenone and the toxicant mixture dissolved in a petroleum distillate to obtain a spray composition of increased effectiveness, the hydroxy-alkyl ether both increasing the effectiveness of the composition and serving as a mutual solvent for the rotenone and petroleum distillate, thereby obviating the use of a co-solvent, such as carbon tetrachloride, in the composition. The proportions of hydroxy-alkyl ether compounds and of the plant extract can be widely varied, to produce compositions effective for insect control.

Various solvents may be employed as a carrier for the toxicants in the above-described compositions, depending upon the use for which the compositions are intended. For example, if an indoor spray is desired, a readily volatile solvent is most suitable. For out-of-door work, e. g. in the spraying of cattle, where it is desirable that the spray residue be retained for a considerable period of time, a heavier and less volatile oil may be employed. In case the hydroxy-alkyl ether has a limited solubility in a preferred solvent such as kerosene or naphtha, a mixture of such petroleum distillate with, for example, methyl-ethyl ketone, or carbon tetrachloride may be employed. Other non-corrosive organic solvents such as benzene, ethylene dichloride, hydrogenated naphthalene, butyl alcohol, and the like, may be used to dissolve the hydroxy-alkyl ether or mixtures thereof with plant extracts, provided only that such solvent be inert with respect to the toxicants employed and non-injurious to humans.

In the following illustrative examples, the insecticidal efficiencies of solutions of the hydroxy-alkyl ethers of alkyl phenols, and combinations thereof with such toxicants as the extracts of pyrethrin and rotenone-bearing plants, were determined according to the Peet-Grady method substantially as described in Soap 8; 4, 1932.

*Example 1*

A standard extract containing the toxic ingredients from 1 pound of pyrethrum flowers per gallon of petroleum distillate, i. e. an equivalent of 0.9 per cent by weight concentration of pyrethrins, was obtained from the National Association of Insecticide and Disinfectant Manufacturers, Inc. The petroleum distillate employed as a solvent in this standard insecticidal solution was a light mineral oil having a boiling range of 345°–508° F. and a flash point of 137° F. (T. C. C.). This standard solution will hereinafter be termed "official control insecticide". Various hydroxy-alkyl ethers were dissolved in this standard solution in amounts ranging between 0.5 and 5 per cent thereof and tested against 3-day old house flies. To provide further basis for comparison, a portion of the official control insecticide was diluted to one-half strength with the petroleum distillate, and this solution also tested both alone and in combination with the hydroxy-alkyl ether compounds. The various runs from which the following "mean" results were computed were made on successive days, at least one control run being made on each such test day with the official control insecticide or diluted sample thereof employed as solvent for the hydroxy-alkyl ether compound under test.

| Material and concentration | Average percentage knockdown in 10 minutes | Mean mortality in 48 hours |
|---|---|---|
| | Percent | Percent |
| Official control insecticide | 99 | 42.4 |
| 50% official control insecticide | 98 | 27.2 |
| 1% beta-hydroxy-ethyl ether of 4-tertiary-butyl-phenol | 65 | 11.5 |
| 2% beta-hydroxy-ethyl ether of 4-tertiary-butyl-phenol | 83 | 17.4 |
| 3% beta-hydroxy-ethyl ether of 4-tertiary-butyl-phenol (B. P. 126.5°–127.5° C. at 4 mm. pressure) | 92 | 47 |
| Official control insecticide+1% of beta-hydroxy-ethyl ether of 4-tertiary-butyl-phenol | 99 | 64.6 |
| Official control insecticide+2% of beta-hydroxy-ethyl ether of 4-tertiary-butyl-phenol | 99 | 78.6 |
| Official control insecticide+3% of beta-hydroxy-ethyl ether of 4-tertiary-butyl-phenol | 99 | 87.1 |
| 50% official control insecticide+1% of beta-hydroxy-ethyl ether of 4-tertiary-butyl-phenol | 98 | 44.8 |
| 50% official control insecticide+2% of beta-hydroxy-ethyl ether of 4-tertiary-butyl-phenol | 99 | 58.4 |
| 50% official control insecticide+3% of beta-hydroxy-ethyl ether of 4-tertiary-butyl-phenol | 100 | 81.2 |

*Example 2*

A 0.1 per cent solution of rotenone (M. P. 163° C.) was prepared by dissolving 0.1 gram of rotenone in 12.5 grams of carbon tetrachloride and diluting to 100 milliliters with the usual petroleum distillate, the carbon tetrachloride being employed as a mutual solvent to hold the rotenone in solution. This solution was employed as a base solution from which to prepare test compositions containing 0.075, 0.05, 0.025, and 0.01 per cent rotenone. Other test solutions were prepared in which the hydroxy-alkyl ethers were employed as a mutual solvent for both rotenone and petroleum distillate, the hydroxy-alkyl ethers serving both as toxicants and as solubilizing agents. Such solutions were prepared by first dissolving the desired amount of rotenone in the hydroxy-alkyl ether and thereafter adding the petroleum distillate to the mixture. As the mortality of flies sprayed with rotenone solutions did not reach a constant value for a period of approximately 72 hours following the spraying operation, all flies sprayed in this series of experiments were examined at 24, 48, and 72 hour periods to determine the mortality resulting from such treatment. The following results are representative of those obtained with compositions containing between 0.01 and 0.075 per cent of rotenone and from 1 to 3 per cent of the hydroxy-alkyl ethers.

| Material and concentration | Average percentage knockdown in 10 minutes | Mean mortality in— | | |
|---|---|---|---|---|
| | | 24 hours | 48 hours | 72 hours |
| | Percent | Percent | Percent | Percent |
| 0.01% rotenone | 75 | 7 | 18 | 25 |
| 0.025% rotenone | 76 | 8.6 | 25.2 | 37.5 |
| 0.05% rotenone | 88 | 11 | 42.3 | 59.4 |
| 0.075% rotenone | 89 | | 41 | 73.2 |
| 3% of beta-hydroxy-ethyl ether of 4-tertiary-butyl-phenol | 94 | 34 | 52 | 54 |
| 2% of beta-hydroxy-ethyl ether of 4-secondary-butyl-phenol | 77 | 28 | 31 | 33 |
| 0.025% rotenone+3% of beta-hydroxy-ethyl ether of 4-tertiary-butyl-phenol | 93 | 25 | 72 | 79.2 |
| 0.05% rotenone+3% of beta-hydroxy-ethyl ether of 4-tertiary-butyl-phenol | 97 | 28 | 74 | 88.2 |
| 0.075% rotenone+3% of beta-hydroxy-ethyl ether of 4-tertiary-butyl-phenol | 99 | 34 | 72.6 | 92.2 |
| 0.05% rotenone+2% of beta-hydroxy-ethyl ether of 4-secondary-butyl-phenol | 92 | 22 | 33 | 74 |

*Example 3*

A series of tests was made to determine the comparative "speeds of knockdown" for pyrethrin solutions, rotenone solutions, and combinations of these with the hydroxy-alkyl ethers. These tests were carried out in the usual manner, except that the interior of the spray chamber was in each instance observed throughout the period of the test, and a determination made of the time required by each insecticidal composition to knock down 50 of the 100 flies used in the test. As before, a number of runs was made in each instance, and a mean value obtained by averaging the results from the several experiments.

This series of tests showed conclusively that the addition of hydroxy-alkyl ethers to petroleum distillate solutions of pyrethrin and rotenone appreciably increased their "knockdown" rate. That is to say, the combination of materials accomplished a more speedy control of flies sprayed therewith. The results obtained with certain representative compounds are given in the following table.

| Material and concentration | Time required to knock down 50 out of 100 flies | |
|---|---|---|
| | Minutes | Seconds |
| Official control insecticide | 2 | 15 |
| 3% beta-hydroxy-ethyl ether of 4-tertiary-butyl-phenol | 3 | 55 |
| Official control insecticide+1% of beta-hydroxy-ethyl ether of 4-tertiary-butyl-phenol | 1 | 45 |
| Official control insecticide+2% of beta-hydroxy-ethyl ether of 4-tertiary-butyl-phenol | 1 | 51 |
| Official control insecticide+3% of beta-hydroxy-ethyl ether of 4-tertiary-butyl-phenol | 1 | 38 |

Similar results were obtained with combinations of rotenone and the hydroxy-alkyl ethers, in each the combination of materials resulting in an appreciable decrease in the time required to control 50% of the test insects.

*Example 4*

A series of investigations was made to determine the stabilizing effect exerted by hydroxy-alkyl ethers upon solutions containing such light-sensitive products as the pyrethrins, rotenone, etc. In making these tests, spray solutions which had been exposed to sunlight for a period of approximately 12 days were compared as regards toxicity with similar solutions prepared at the same time but stored away from the light. The following data is illustrative of the results obtained.

In a similar manner, other hydroxy-alkyl ethers were tested with pyrethrum and rotenone at varying concentrations as follows:

| Material and concentration | Number days exposure to light | Average percentage knockdown in 10 minutes | Mean mortality in 48 hours |
|---|---|---|---|
| | | Percent | Percent |
| Official control insecticide | 0 | 100 | 53 |
| Do | 7 | 96 | 36 |
| Do | 21 | 96 | 29 |
| Do | 42 | 54 | 5 |
| 2% beta-hydroxy-ethyl ether of 2.4-diethyl-phenol | 0 | 77 | 26 |
| Official control insecticide+2% of beta-hydroxy-ethyl ether of 4-secondary-butyl-phenol | 0 | 98 | 69 |
| Official control insecticide+2% of beta-hydroxy-ethyl ether of 4-secondary-butyl-phenol | 7 | 99 | 66 |
| Official control insecticide+2% of beta-hydroxy-ethyl ether of 4-secondary-butyl-phenol | 42 | 90 | 33 |
| 2% beta-hydroxy-ethyl ether of 2.4-diethyl-phenol | 0 | 63 | 30 |
| Official control insecticide+2% of beta-hydroxy-ethyl ether of 2.4-diethyl-phenol | 0 | 100 | 67 |
| Official control insecticide+2% of beta-hydroxy-ethyl ether of 2.4-diethyl-phenol | 7 | 99 | 70 |
| Official control insecticide+2% of beta-hydroxy-ethyl ether of 2.4-diethyl-phenol | 21 | 97 | 52 |
| Official control insecticide+2% of beta-hydroxy-ethyl ether of 2.4-diethyl-phenol | 42 | 90 | 33 |

Of the above, the uncombined rotenone and pyrethrum solutions become colorless upon exposure to light, and each developed a substantial amount of precipitate. The combination of rotenone or pyrethrin with the beta-hydroxy-ethyl ether of 4-tertiary-butyl-phenol give solutions, which, upon exposure to sunlight, suffered some loss in color but were substantially free from precipitate. The toxicity of combinations of the insecticidal plant materials and the hydroxy-alkyl ethers did not appear to be materially affected by exposure to sunlight.

*Example 5*

Similarly, other hydroxy-alkyl ethers have been tested as fly spray materials. The following table sets forth the per cent knockdown and mor-

| Material and concentration | Number days exposure to light | Average percentage knockdown in 10 minutes | Mean mortality in— | | |
|---|---|---|---|---|---|
| | | | 24 hours | 48 hours | 72 hours |
| | | Percent | Percent | Percent | Percent |
| Official control insecticide | 0 | 100 | 49.7 | 51 | 51.6 |
| Do | 12 | 93 | 21 | 23.6 | 26.3 |
| 3% beta-hydroxy-ethyl ether of 4-tertiary-butyl-phenol | 0 | 88 | 33.3 | 39 | 39.7 |
| 3% beta-hydroxy-ethyl ether of 4-tertiary-butyl-phenol | 12 | 84 | 33.6 | 36 | 36.6 |
| Official control insecticide+3% of beta-hydroxy-ethyl ether of 4-tertiary-butyl-phenol | 0 | 99 | 77.7 | 89.6 | 92 |
| Official control insecticide+3% of beta-hydroxy-ethyl ether of 4-tertiary-butyl-phenol | 12 | 95.6 | 68 | 81 | 82 |
| 0.1% rotenone | 0 | 92 | 15.6 | 48.3 | 75.6 |
| Do | 12 | 42 | 6 | 8 | 11.3 |
| 0.1% rotenone+3% of beta-hydroxy-ethyl ether of 4-tertiary-butyl-phenol | 0 | 98 | 35.3 | 93 | 99.3 |
| 0.1% rotenone+3% of beta-hydroxy-ethyl ether of 4-tertiary-butyl-phenol | 12 | 95 | 38.3 | 84.3 | 93 | tality obtained with petroleum distillate solutions of certain representative compounds.

tion and properties of a large number of these hydroxy-alkyl ethers of alkyl phenols.

| Compound | Percent tested | Average percentage knockdown in 10 minutes | Mean mortality in— | |
|---|---|---|---|---|
| | | | 24 hours | 48 hours |
| | | Percent | Percent | Percent |
| Beta-hydroxy-ethyl ether of 4-tertiary-amyl-phenol (B. P. 145°-148° C. at 4 mm. pressure) | 3 | 81 | 40 | 45 |
| Beta-hydroxy-ethyl ether of 2-methyl-4-tertiary-butyl-phenol (M. P. 36° C.) | 3 | 88 | 36 | 42 |
| Hydroxy-propyl ether of 4-tertiary-butyl-phenol (M. P. 45° C.) | 3 | 86 | 26 | 31 |
| Beta-hydroxy-ethyl ether of 4-secondary-butyl-phenol (B. P. 135°-137° C. at 7 mm. pressure) | 3 | 84 | 46 | 51 |
| Beta-hydroxy-ethyl ether of 2,4-diethyl-phenol (B. P. 129°-132° C. at 4 mm. pressure) | 3 | 92 | 57 | 61 |

Similarly, other hydroxy-alkyl ethers of alkylphenols may be used in the compositions described in the foregoing examples, e. g. beta-hydroxyethyl ether of 4-normal-butyl-phenol; beta-hydroxy-ethyl ether of 4-isobutyl-phenol; beta-hydroxy-ethyl ether of 4-normal-amyl-phenol; beta-hydroxy-ethyl ether of 2-ethyl-4-tertiary-amyl-phenol; beta-hydroxy-ethyl ether of 2,4-di-isopropyl-phenol; beta-hydroxy-ethyl ether of di-isopropyl-phenol; beta-hydroxy-ethyl ether of 2-ethyl-4-isopropyl-phenol; beta-hydroxy-ethyl ether of 4-normal-hexyl-phenol; beta-hydroxy-ethyl ether of 4-secondary-hexyl-phenol; beta-hydroxy-ethyl ether of 4-tertiary-hexyl-phenol; beta-hydroxy-ethyl ether of 4-heptyl-phenol; hydroxy-propyl ether of 2,4-diethyl-phenol; hydroxy-propyl ether of 2-methyl-4-isopropyl-phenol; hydroxy-propyl ether of 4-secondary-butyl-phenol; hydroxy-butyl ether of 4-secondary-butyl-phenol; hydroxy-butyl ether of 2,4-diethyl-phenol; etc. The above compounds and those shown in the foregoing examples may be prepared in known manner by reacting an alkyl phenol with a halohydrin or mono-halo-aliphatic alcohol in the presence of a suitable alkali. Our co-pending applications, Serial Nos. 127,177, filed February 23, 1937; 126,810, filed February 20, 1937; 158,335, filed August 10, 1937; 184,561, filed January 12, 1938; and 184,562, filed January 12, 1938, of which the present application is a continuation-in-part, disclose in detail the preparation Other modes of applying the principle of our invention may be employed instead of those explained, change being made as regards the materials or the amounts thereof employed, provided the compositions defined by any of the following claims or their equivalent be employed.

We therefore particularly point out and distinctly claim as our invention:

1. A substantially water-free insecticidal spray comprising as a toxicant the beta-hydroxy-ethyl ether of 4-secondary-butyl-phenol dissolved in a non-corrosive organic solvent.

2. A substantially water-free insecticidal spray comprising as a toxicant the beta-hydroxy-ethyl ether of 2,4-diethyl-phenol dissolved in a non-corrosive organic solvent.

3. A substantially water-free insecticidal spray comprising a solution of a toxicant selected from the group consisting of the beta-hydroxy-ethyl ethers of 2,4-diethyl phenol and 4-secondary-butyl phenol in a non-corrosive organic solvent.

4. A substantially water-free insecticidal spray comprising a non-corrosive organic solvent having dissolved therein a toxicant selected from the class consisting of the extracts of pyrethrin- and rotenone-bearing plants, and as an added toxicant a compound selected from the group consisting of the beta-hydroxy-ethyl ethers of 2,4-diethyl phenol and 4-secondary-butyl phenol.

GERALD H. COLEMAN.
JOHN W. ZEMBA.